United States Patent
Kagaya

[19]

[11] Patent Number: 6,088,350
[45] Date of Patent: Jul. 11, 2000

[54] DIGITAL RADIO COMMUNICATION APPARATUS AND METHOD EMPLOYING FREQUENCY HOPPING FOR MULTI-PURPOSE DATA PROCESSING APPARATUSES

[75] Inventor: Naoto Kagaya, Yokohama, Japan

[73] Assignee: Canon Kabushiki Kaisha, Tokyo, Japan

[21] Appl. No.: 08/786,337

[22] Filed: Jan. 23, 1997

[30] Foreign Application Priority Data

Jan. 24, 1996 [JP] Japan ................................. 8-009967

[51] Int. Cl.⁷ ............................................... H04B 7/212
[52] U.S. Cl. .......................................... 370/347; 370/445
[58] Field of Search .................................... 370/337, 338, 370/445, 349, 401, 447, 231, 345, 347, 442, 458; 375/202

[56] References Cited

U.S. PATENT DOCUMENTS

| | | | |
|---|---|---|---|
| 5,379,279 | 1/1995 | Backof et al. | 370/280 |
| 5,502,722 | 3/1996 | Fulghum | 370/343 |
| 5,537,434 | 7/1996 | Persson et al. | 375/201 |
| 5,781,582 | 7/1998 | Sage et al. | 375/202 |

*Primary Examiner*—Alpus H. Hsu
*Assistant Examiner*—Mitchell Slavitt
*Attorney, Agent, or Firm*—Fitzpatrick, Cella, Harper & Scinto

[57] ABSTRACT

A digital signal radio communication system employing frequency hopping for multi-purpose data processing apparatuses communicates predetermined information to a multi-purpose data processing apparatus by transmitting a carrier to a predetermined number of time slots of a communication frame having a plurality of time slots and communicates different information in accordance with which time slot the carrier is to be transmitted to among the plurality of time slots. A detector detects whether the carrier is in the predetermined number of time slots among the plurality of time slots or in more than the predetermined number of time slots. A controller performs control based on the carrier when the detector detects that the carrier is in the predetermined time slots, and judges that noise is generated when the detector detects the carrier in more than the predetermined number of time slots.

40 Claims, 20 Drawing Sheets

FIG.6

| CS0 | CS1 | CS2 | PR | UW | DA | Data | CRC | CF |

FIG.7

| CF | CS0 | CS1 | CS2 | PR | UW | DA | Data | GT |

FIG.8

| CMD | NUM | LNG | FLG | Data1 |

FIG.9

| CMD1 | NUM1 |

| CS | PR | UW | T/R | CRC | GT |

DIGITAL RADIO COMMUNICATION APPARATUS AND METHOD EMPLOYING FREQUENCY HOPPING FOR MULTI-PURPOSE DATA PROCESSING APPARATUSES

BACKGROUND OF THE INVENTION

1. Field of the Invention

This invention relates to a radio communication apparatus for performing communication using radio waves, and a method for controlling such an apparatus.

2. Description of the Related Art

Conventionally, when performing communication between radio communication apparatuses or between a radio communication apparatus and a radio-communication control apparatus, the transmission side transmits data irrespective of the state of reception processing at the reception side. When control data for temporarily interrupting the transmission of the data is received, the transmission side analyzes the control data and,temporarily interrupts the transmission of the data.

When the reception processing of the reception side starts to be delayed,because the amount of data being transmitted is too large, the reception side forms and transmits control data asking the transmission side to interrupt the transmission of the data.

The transmission side transmits a carrier for requesting data transmission a predetemined number of times before transmitting data to declare an intention of data transmission to another radio communucation terminal within the same system. By detecting the carrier indicating the declaration of intention of data transmission for the predetermined number of times, the other radio communication apparatus recognizes the presence of a radio communication apparatus intending to transmit data. Thus, communication is performed avoiding collision of transmitted data.

In the above-described conventional approach, when the reception processing of the reception side starts to be delayed, the radio communication apparatus at the reception side forms control data, which is transmitted to the radio communication apparatus at the transmission side after superimposing the control data on the carrier. Hence, time is required for that processing, and the reception processing is further delayed.

Furthermore, since the radio communication apparatus at the transmission side interrupts data transmission after analyzing the control data, the response for interrupting data transmission after receiving the control data is slow.

In addition, as for the carrier for requesting data transmission in order to avoid collision of data transmitted from the radio communication apparatus of the transmission side, the reception side cannot determine whether the received signal is the carrier for the request of data transmission or surrounding noise until the carrier is received the predetermined number of times. Hence, a time is required until the carrier for the request of data transmission is detected.

SUMMARY OF THE INVENTION

It is an object of the present invention to allow notification of control information to an apparatus in communication by a simple method.

It is a further object of the present invention to allow reception of notification of control information without performing complicated processing.

It is a still further object of the present invention to allow quick performance of control between radio apparatuses.

It is still another object of the present invention to make a carrier transmitted/received between radio communication apparatuses correspond to control information.

It is still a further object of the present invention to quickly interrupt data communication of a communication partner when the processing of data received from the communication partner is delayed.

It is still another object of the present invention to perform control corresponding to a received carrier.

It is still another object of the present invention to allow easy determination as to whether or not noise is generated.

According to one aspect, the present invention which achieves these objectives relates to a radio communication apparatus for performing communication using radio waves, including a carrier transmission unit for transmitting a carrier, a reception unit for receiving data transmitted from an apparatus in communication, a data processing unit for processing the data received by the reception unit, a determination unit for determining a state of the processing of the data processing unit, and a control unit for transmitting a carrier corresponding to control information to notify the apparatus in communication by controlling the carrier transmission unit in accordance with the determination of the determination unit.

According to another aspect, the present invention which achieves these objectives relates to a radio communication apparatus for performing communication using radio waves, including carrier reception unit for receiving a carrier, a transmission unit for transmitting data to an apparatus in communication, a determination unit for detecting the carrier received by the carrier reception unit during the transmission by the transmission unit and for determining control information corresponding to the contents of the detection, and a control unit for controlling the transmission unit in accordance with the determination of the determination unit.

According to still another aspect, the present invention which achieves these objectives relates to a radio communication apparaus for performing communication by transmitting/receiving a communication frame having a plurality of time slots for detecting a carrier, including a reception unit for receiving the communication frame, a detection unit for detecting the carrier in the time slots for carrier detection of the communication frame received by the reception unit, and a determination unit for determining that noise is generated when the detection unit has detected the carrier in at least two of the time slots for carrier detection.

According to still another aspect, the present invention which achieves these objectives relates to a method for controlling a radio communication apparatus for performing communication using radio waves, including the steps of processing received data, determining a state of the processing in the processing step, and controlling the apparatus so as to transmit a carrier corresponding to control information to be notified to an apparatus in communication in accordance with a result of the determination in the determining step.

According to still another aspect, the present invention which achieves these objectives relates to a method for controlling a radio communication apparatus for performing communication using a radio wave, including the steps of detecting a carrier detected during the communication, determining control information corresponding to the contents of the detection in the detecting step, and performing a predetermined control in accordance with a result of the determination in the determining step.

According to still another aspect, the present invention which achieves these objectives relates to a method for controlling a radio communication apparatus for performing communication by transmitting/receiving a communication frame having a plurality of time slots for detecting a carrier, including the steps of detecting the carrier in the time slots for carrier detection, determining that noise is generated when the carrier has been detected in at least two of the time slots for carrier detection, and performing a predetermined control in accordance with the determination in the determining step.

The foregoing and other objects, advantages and features of the present invention will become more apparent from the following description of the preferred embodiments taken in conjunction with the accompanying drawings.

BRIEF DESCRIPTION OF THE DRAWINGS

FIG. 6 is a diagram illustrating the configuration of a logic-control-channel frame in the first embodiment;

FIG. 7 is a diagram illustrating the configuration of a data-channel frame in the first embodiment;

FIG. 8 is a diagram illustrating the configuration of a data frame in the first embodiment;

FIG. 9 is a diagram illustrating the configuration of a retransmission-request frame in the first embodiment;

DESCRIPTION OF THE PREFERRED EMBODIMENTS

Preferred embodiments of the present invention will now be described in detail with reference to the drawings.

First Embodiment

In a first embodiment of the present invention, a case in which digital radio communication according to a frequency hopping method is used for transmission between extensions in an exchange system will be described in detail.

The System Configuration

Figure 1:
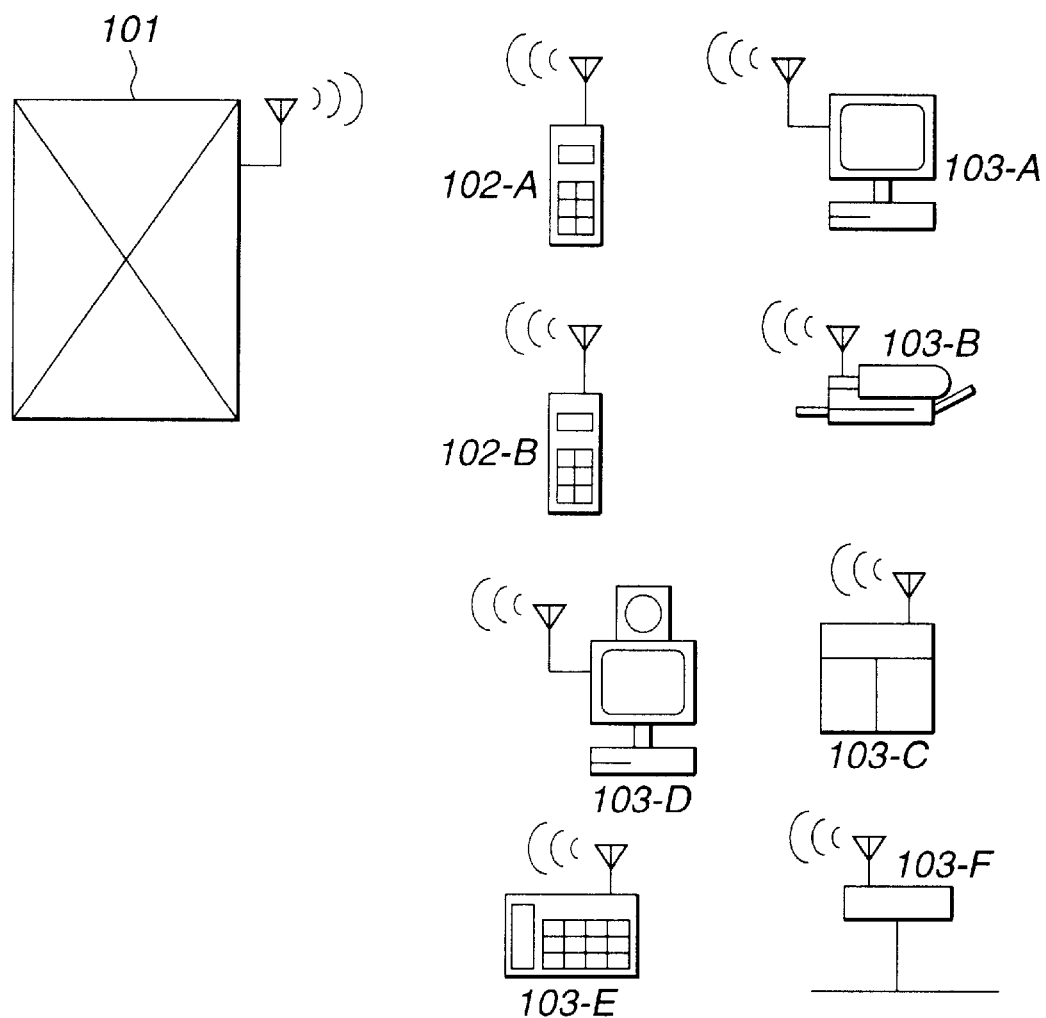
FIG. 1 is a diagram illustrating the configuration of a system according to a first embodiment of the present invention.

FIG. 1 illustrates the configuration of the system in the first embodiment.

The system includes a central control station 101 having the function of radio connection between respective radio terminals, a plurality of radio telephone sets 102-A and 102-B for communicating control data and voice data, and data terminal apparatuses 103-A–103-F for performing communication of control data and direct inter-terminal data communication. In the first embodiment, the data terminal apparatus is defined as "a combination of a terminal having the function of performing burst-like transmission of an arbitrary amount of data (a data terminal) and a radio adapter for performing radio communication with the data terminal". A computer 103-A, a printer 103-B, a copier 103-C, a video-conference terminal-103-D, a facsimile apparatus 103-E, a LAN (local area network) bridge 103-F, or any other terminal for performing data processing, such as an electronic camera, a video camera, a scanner or the like, can be used as the data terminal.

The Configuration of the Central Control Station

Figure 2:
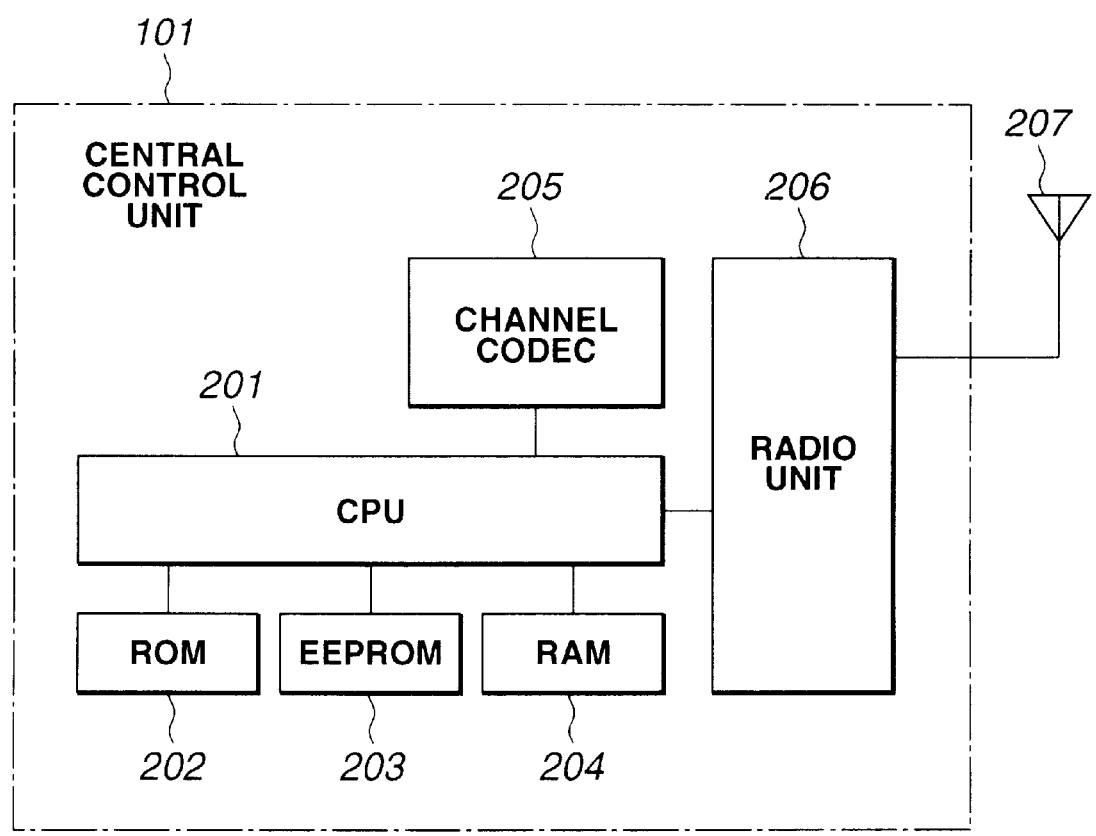
FIG. 2 is a block diagram illustrating the configuration of a central control station according to the first embodiment.

FIG. 2 is a diagram illustrating the configuration of the central control station 101. In FIG. 2, a CPU (central processing unit) 201 operates as the center of the central control station 101, and performs various kinds of controls for the entire central control station 101, including the control of conversation channels and the control of a radio unit 206. A ROM (read-only memory) 202 stores control programs of the CPU 201. An EEPROM (electrically erasable and programmable read-only memory) 203 stores calling codes (system ID's) of the exchange system. A RAM (random access memory) 204 stores various kinds of data for the control of the CPU 201 and provides work areas for various kinds of calculation operations. A channel CODEC (coder-decoder) 205 performs processing, such as scramble or the like, for a control signal under the control of the CPU 201, and time-division multiplexing in a predetermined frame. Under the control of the CPU 201, the radio unit 206 modulates a digital signal provided in the form of frames from the channel CODEC 205 so as to be transmitted via radio waves and transmits the modulated signal to an antenna 207, and demodulates a signal received from the antenna 207 via a radio wave and processes the demodulated signal into a digital signal in the form of frames. The antenna 207 transmits/receives a radio signal.

The Configuration of the Radio Adapter

Figure 3:
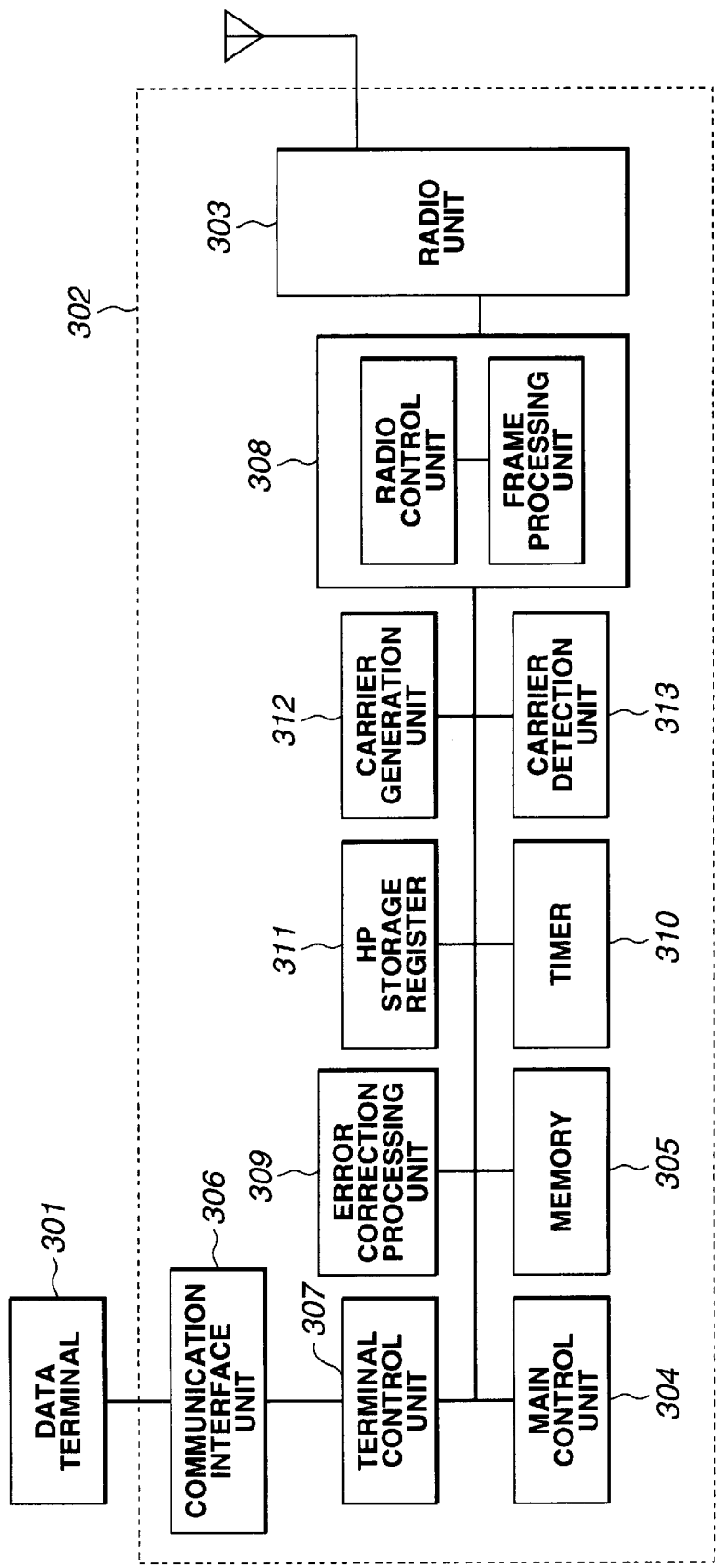
FIG. 3 is a block diagram illustrating the configuration of a radio adapter according to the first embodiment.

FIG. 3 is a block diagram illustrating the internal configuration of a data communication terminal capable of being accommodated in the system, and a radio adapter connected to the data terminal.

In FIG. 3, there are shown a data terminal 301, a radio adapter 302, and a radio unit 303. The data terminal 301 indicates a personal computer, a work station, a printer, a facsimile apparatus, or any other data terminal apparatus connected to the radio adapter 302 via a communication cable or an internal bus.

A main control unit 304 includes a CPU, peripheral devices for performing interrupt control, DMA (direct memory access) control and the like, an oscillator for generating a system clock signal, and the like which are well known in the art, and controls respective blocks within the radio adapter 302.

A memory 305 includes a ROM for storing programs used by the main control unit 304, a RAM used as buffer regions for various kinds of processing, and the like.

A communication interface (I/F) unit 306 operates as a communication I/F with a data terminal apparatus, such as the data terminal 301 (for example, a transmission I/F, such as RS232C, Centronix, LAN (local area network) or the like, an internal bus of a personal computer or a work station, such as an ISA (Industry Standard Architecture) bus, a PCMCIA (Personal Computer Memory Card International Association) I/F, or the like).

A terminal control unit 307 performs various kinds of communication controls necessary during data communication between the data terminal 301 and the radio adapter 302 via the communication I/F 306.

A channel CODEC 308 performs frame processing and radio control. Data provided in frames by the channel CODEC 308 is transmitted to the central control station or another data terminal via the radio unit 303.

An error correction processing unit 309 is used to reduce bit errors generated in data during radio communication. When transmitting data, an error-correcting code is inserted in the transmitted data. When receiving data, error positions and error patterns are calculated by calculation processing, and bit errors in the received data are corrected.

A timer 310 provides timing signals used by respective blocks within the radio adapter 302. A hopping-pattern storage register 311 stores moving frequencies. A carrier generation unit 312 generates a carrier. A carrier detection unit 313 detects whether or not a carrier is generated.

In the above-described configuration, upon reception of communication data from the data terminal 301 via the communication I/F unit 306, the radio adapter 302 stores the received data in the memory 305. The communication data is subjected to error correction coding by the error correction processing unit 309, and the resultant data is transmitted to the channel CODEC 308.

The channel CODEC 308 performs transmission processing of providing transmission frames by combining the data subjected to error correction coding, a carrier generated from the carrier generation unit 312 in order to perform declaration of an intention of data transmission, and various kinds of control data necessary for performing communication. After the carrier has been detected by the carrier detection unit 313, the channel CODEC 308 causes the radio unit 303 to convert the resultant data into a radio signal and transmit the signal via the antenna.

A radio signal received via the antenna is decomposed into control data and communication data by the channel CODEC 308.

The obtained control data is subjected to error correction coding by the error correction processing unit 309, and is then analyzed by the main control unit 304. The main control unit 304 performs reception processing of controlling the operation of the radio adapter 302 in accordance with the result of the analysis. If communication data to be transmitted to the data terminal 301 is present, the main control unit 304 transmits the data to the data terminal 301 via the communication I/F unit 306 after causing the error correction processing unit 309 to perform error correction.

Radio Frame

FIGS. 4–11 illustrate radio frames used in the system. The internal data of each frame will now be described in detail.

Figure 4:
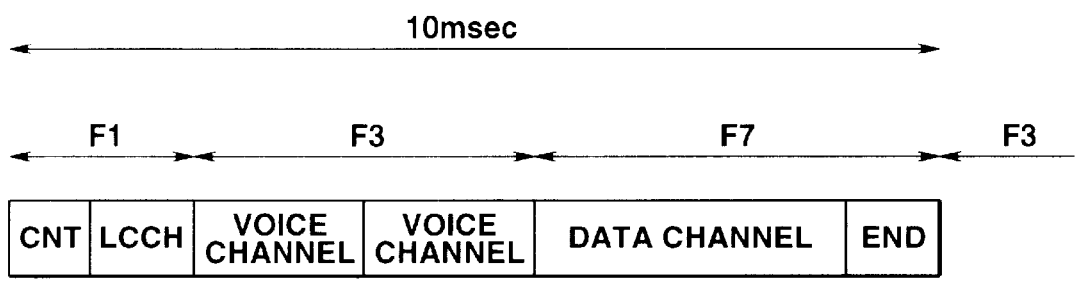
FIG. 4 is a diagram illustrating the configuration of a communication frame in the first embodiment.

FIG. 4 illustrates the configuration of the entire frame. In FIG. 4, CNT represents a system control channel, and LCCH represents logic control channel. One communication operation is performed using one voice channel for each direction. A data channel is used for data transmission. END represents a time period for frequency switching for the next frame. F1, F3 and F7 represent frequency channels used when transmitting data via radio waves. Different frequency channels are used to indicate groups of frames.

Figure 5:
FIG. 5 is a diagram illustrating the configuration of a system-control-channel frame in the first embodiment.

FIG. 5 illustrates the frame configuration of the system control channel CNT. In FIG. 5, CS represents a carrier sensing time period equal to 12.8 μsec, PR represents a 56-bit preamble for catching bit synchronism, SYN represents a a frame synchronizing signal comprising a dummy bit +31 bits, ID represents a 63-bit ringing signal + a dummy bit, BF represents 8-bit basic-frame-number information (cycling between 1 and 20), NF represents 8-bit multiframe-number information (cycling between 1 and 16), WA represents a field where the system address of a terminal to be started from among terminals in a sleeve mode is written, Rev represents an area number for discrimination from the adjacent cell, CRC represents error detection information for detecting errors in CS~Rev, and GT represents a guard time. This channel is generated from the central control station in order to obtain synchronism of the entire system and to perform control.

FIG. 6 illustrates the frame configuration of the logic control channel LCCH. In FIG. 6, CS0, CS1 and CS2 represent carrier-sensing time slots, and can be provided with a priority order in accordance with the object of use. PR represents a 56-bit preamble for catching bit synchronism, UW represents a 24-bit unique word (for catching byte synchronism), and DA represents a field where a system address is written. The same address as the system's own address is received. Data represents a data slot for accommodating logic control data, CRC represents error-check information for data between BF and Data of LCCH, and CF represents a guard time for frequency switching. The logic control channel is transmitted with the same frequency as that of the frame synchronizing signal channel, and is used, for example, when each terminal performs call setting.

FIG. 7 illustrates the frame configuration of the data channel. In FIG. 7, CF represents a guard time for frequency switching, CS0, CS1 and CS2 represent carrier sensing time slots, and can be provided with a priority order in accordance with the object of use. PR represents a 56-bit preamble for catching bit synchronism, UW represents a 24-bit unique word (for catching byte synchronism), and DA represents a field where a system address is written. The same address as the system's own address is received. When call setting has been completed and a hopping pattern has been allocated from the central control station, data is transmitted by changing the frequency to the allocated hopping pattern only during this frame.

Figures 8, 9:
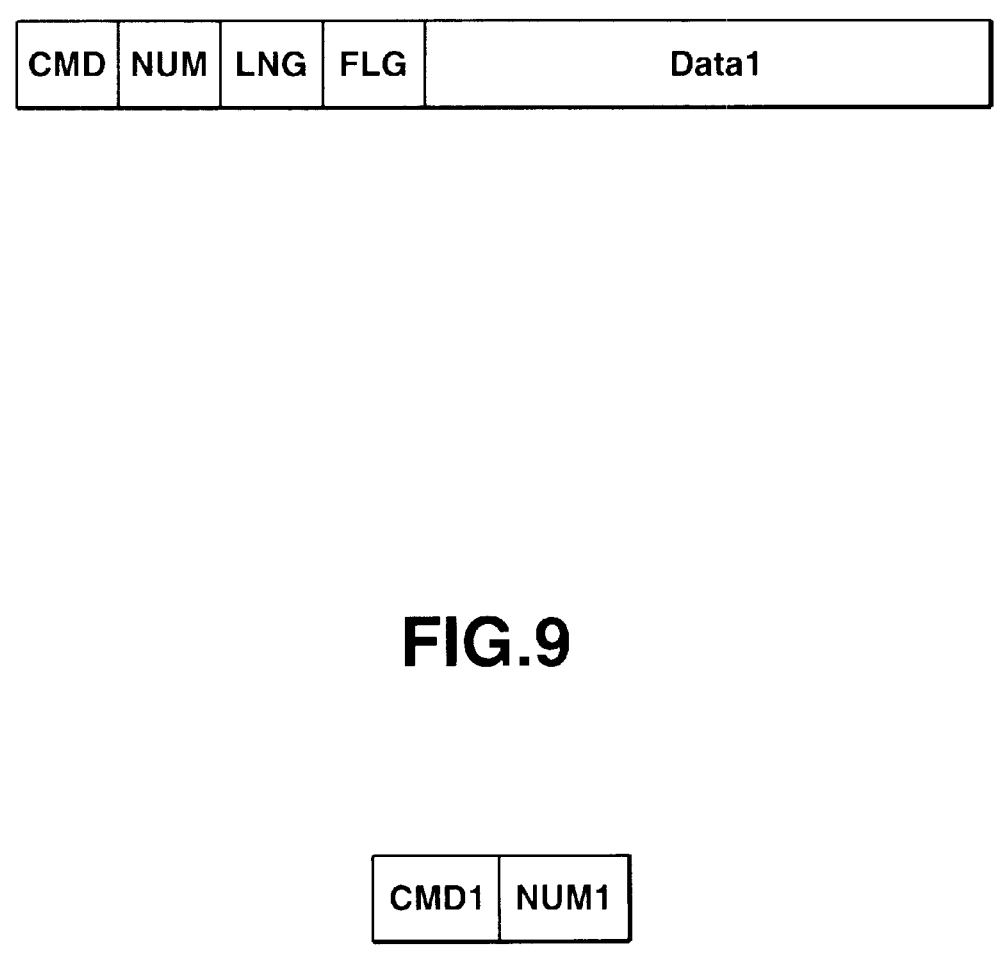

FIG. 8 illustrates the frame configuration of the data slot Data. In FIG. 8, CMD represents an ID indicating that the frame is for data transmission, NUM represents the number of the packet, LNG represents the effective data length, and FLG represents a flag indicating if retransmission is possible. Data is stored in Data1.

FIG. 9 illustrates the frame configuration of the retransmission request FLG. In FIG. 9, CMD1 represents an ID indicating that the frame is for request of retransmission, and NUM1 represents the packet number of data as an object of request of retransmission.

Figures 10, 11:
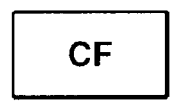
FIG. 10 is a diagram illustrating the configuration of a voice-channel frame in the first embodiment.
FIG. 11 is a diagram illustrating the configuration of an END frame in the first embodiment.

FIG. 10 illustrates the frame configuration of the voice channel. In FIG. 10, CS represents a carrier sensing time period equal to 12.8 μsec, PR represents a 56-bit preamble for catching bit synchronism, UW represents a 24-bit unique word (for catching byte synchronism), T/R represents 32-kbps B-channel information and information relating to error detection for data, and GT represents a guard time. When performing communication of voice data, another hopping pattern is received from the central control station, and the voice data is transmitted by changing the frequency to the allocated hopping pattern only during this frame.

FIG. 11 illustrates the frame configuration of END. In FIG. 11, CF represents a guard time for frequency switching.

About Frequency Hopping Pattern

Figure 12:
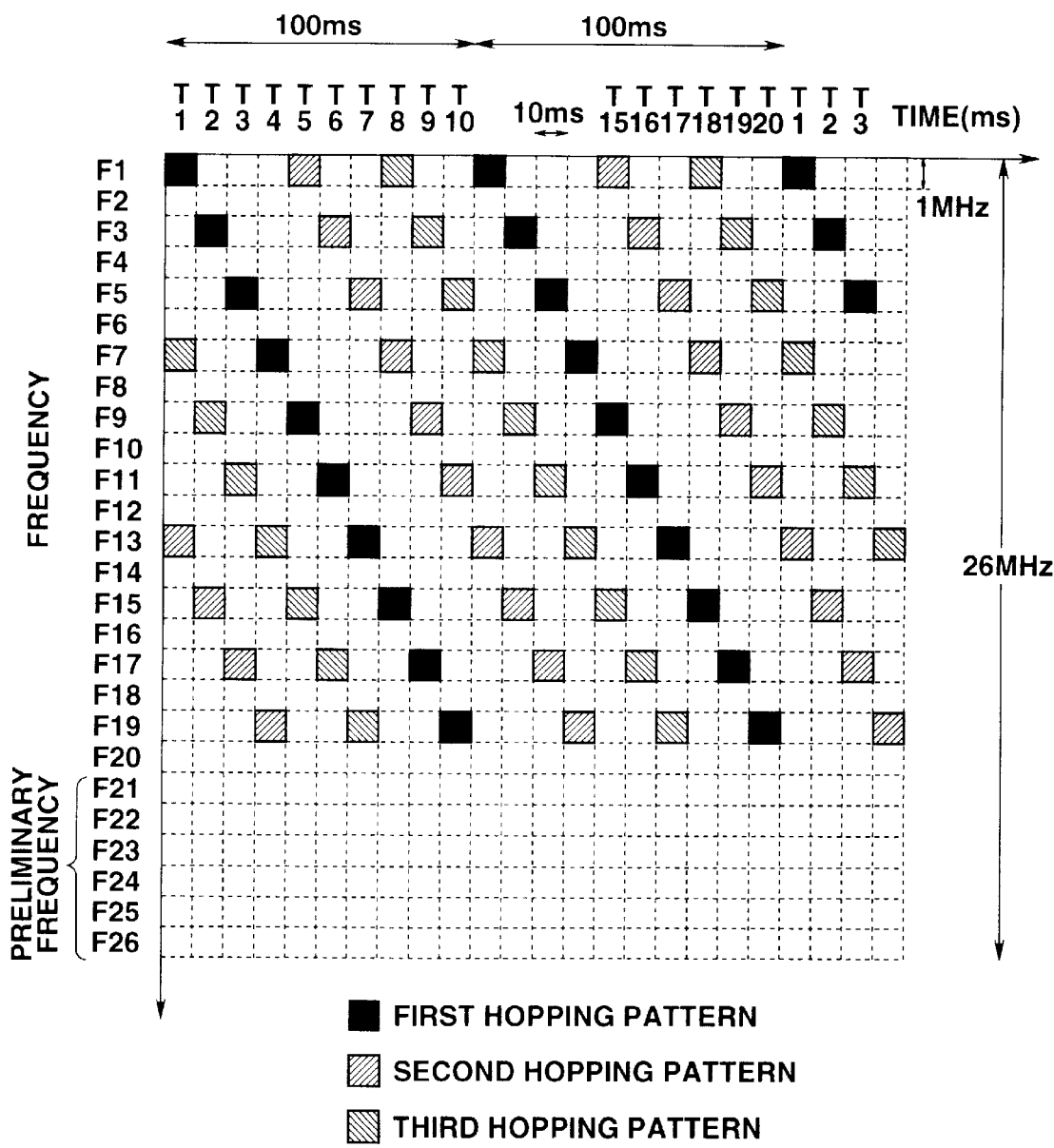
FIG. 12 is a diagram illustrating a pattern of frequency hopping in the first embodiment.

FIG. 12 is a schematic diagram illustrating frequency hopping used in the system.

In this system, 26 frequency channels having a width of 1 MHz utilizing a band of 26 MHz are used. In consideration of a case in which some frequencies cannot be used due to interference noise or the like, 10 frequency channels are selected from among the 26 channels, and frequency hopping is performed for the selected frequency channels with a predetermined order.

In this system, one frame has a length of 10 ms, and the frequency channel hops for every frame. Accordingly, the length of the period of one hopping pattern is 100 ms.

In FIG. 12, different hopping patterns are indicated by different patterns. By thus using patterns arranged so that the same frequency is not used at the same time for each frame, it is possible to prevent the generation of errors in data, and the like.

This system also has the feature that, when a plurality of apparatuses are connected, different hopping patterns are used for the respective apparatuses in order to prevent interference between the connected apparatuses. Thus, it is possible to realize a system having a multicell configuration, and to provide a wide service area.

DETAILED DESCRIPTION OF THE OPERATION

As described above, in this system, frames are provided for communication between a central control station and a radio telephone set or a data terminal, or between different terminals, and control of switching the frequency in use for a predetermined time period is performed.

A description will now be provided of specific operations in the system in various cases.

1. Procedures of a Starting Operation

This system has the feature that, before using a voice or data channel, a-hopping pattern to be used is determined using a logic control channel (LCCH) subjected to time-division multiplexing within a frame.

Figure 13:
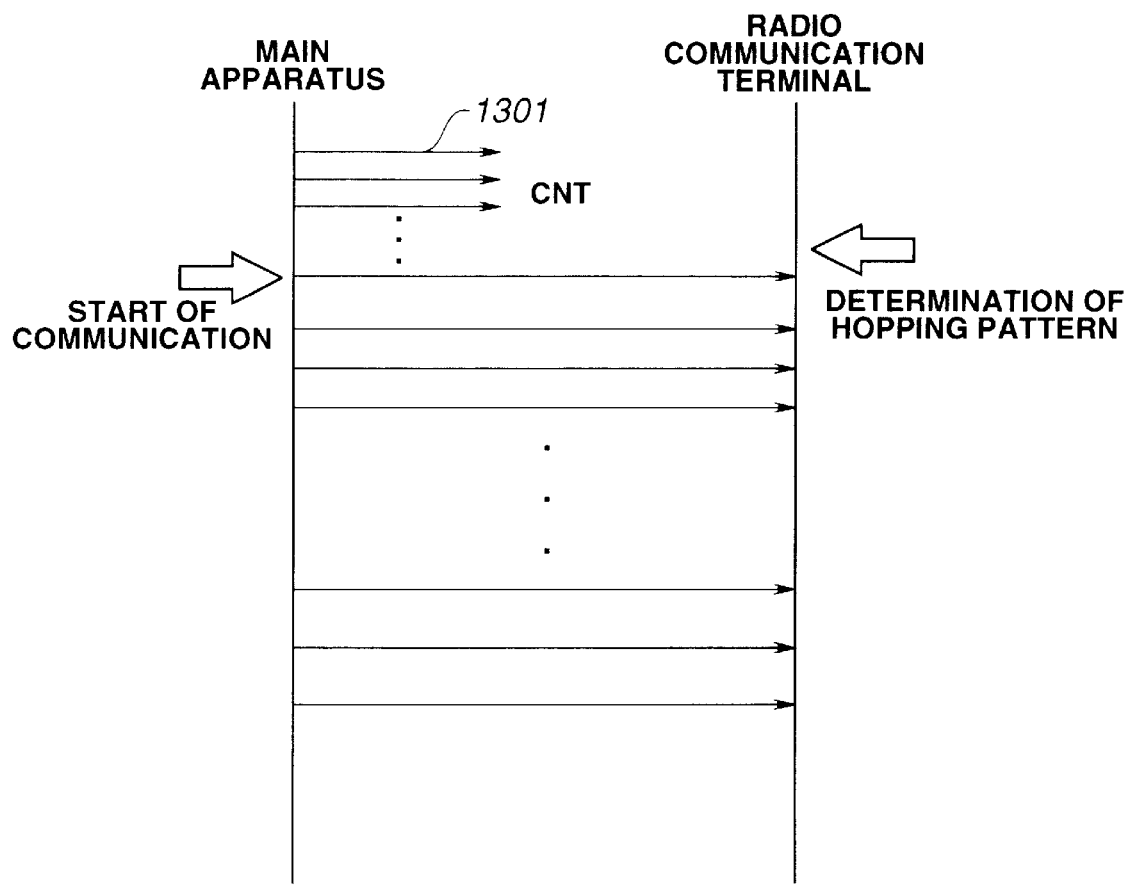
FIG. 13 is a diagram illustrating a sequence of start of a radio communication terminal in the first embodiment.
Figure 14:
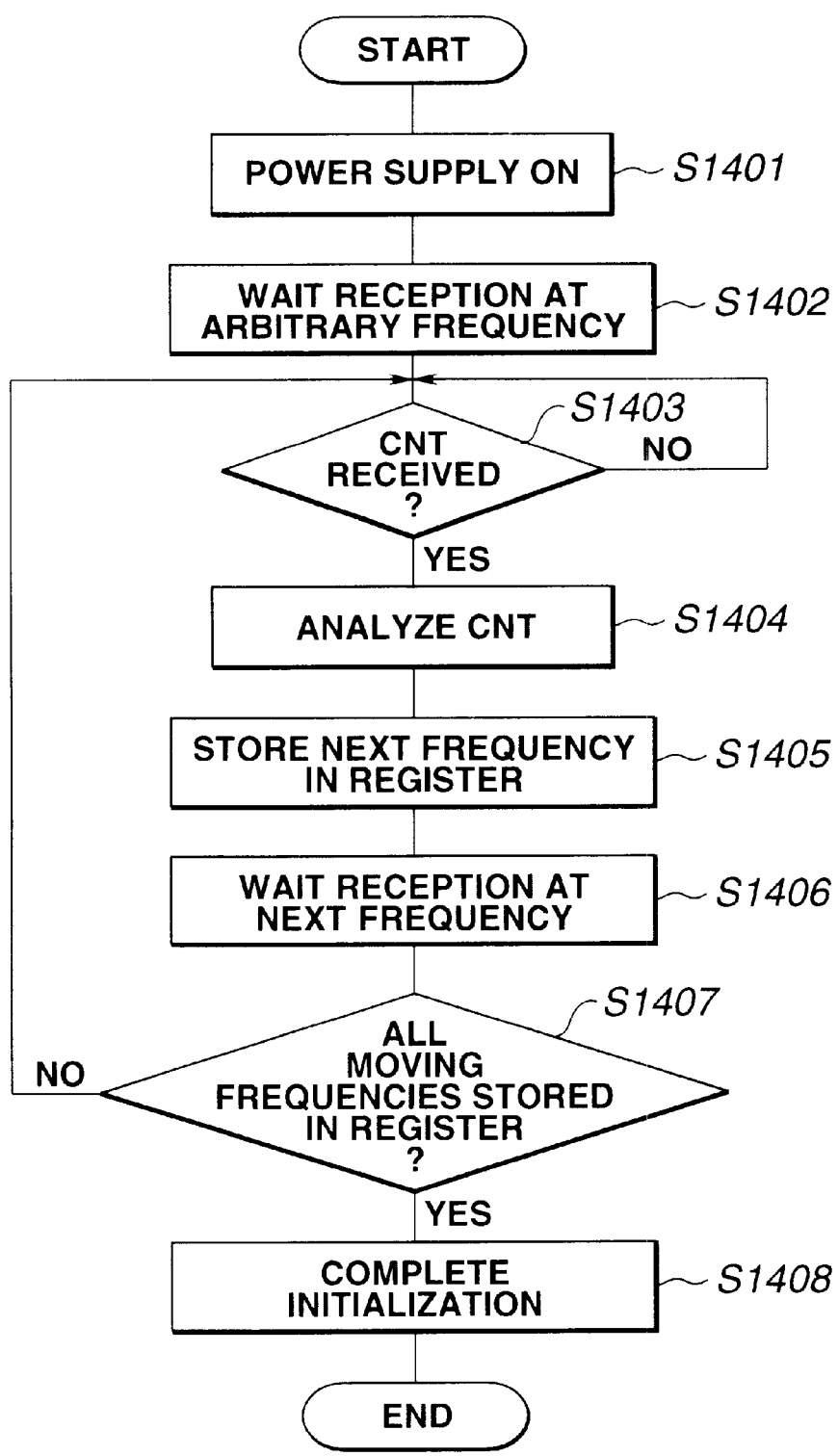
FIG. 14 is a flowchart illustrating processing of initializing the radio communication terminal in the first embodiment.

FIG. 13 is a diagram illustrating a sequence of start of a radio communication terminal. FIG. 14 is a flowchart illustrating processing of initializing the radio communication terminal.

In this system, control data CNT (1301) is always transmitted from the central control station with a certain hopping pattern.

When the power supply of the radio communication terminal has been turned on (step S1401), reception is awaited at an arbitrary frequency (step S1402), and the CNT (1301) is received at that frequency. Upon reception of the first CNT (1301) (as a result of determination in step S1403), the CNT is analyzed and information relating to the frequency of the next frame included in the CNT is acquired (step S1404). The frequency of the next frame is stored in the hopping-pattern storage register 311 (step S1405). Then, frequency hopping is started and reception is awaited at the next frequency (step S1406). When all moving frequencies have been stored in the hopping-pattern storage register 311 in the above-described manner (as a result of determination in step S1407), initialization is terminated and communication is started (step S1408). Thus, the radio communication terminal can efficiently acquire and store the hopping pattern for system control.

2. Processing During Data Transmission Between Radio Communication Terminals

Figure 15:
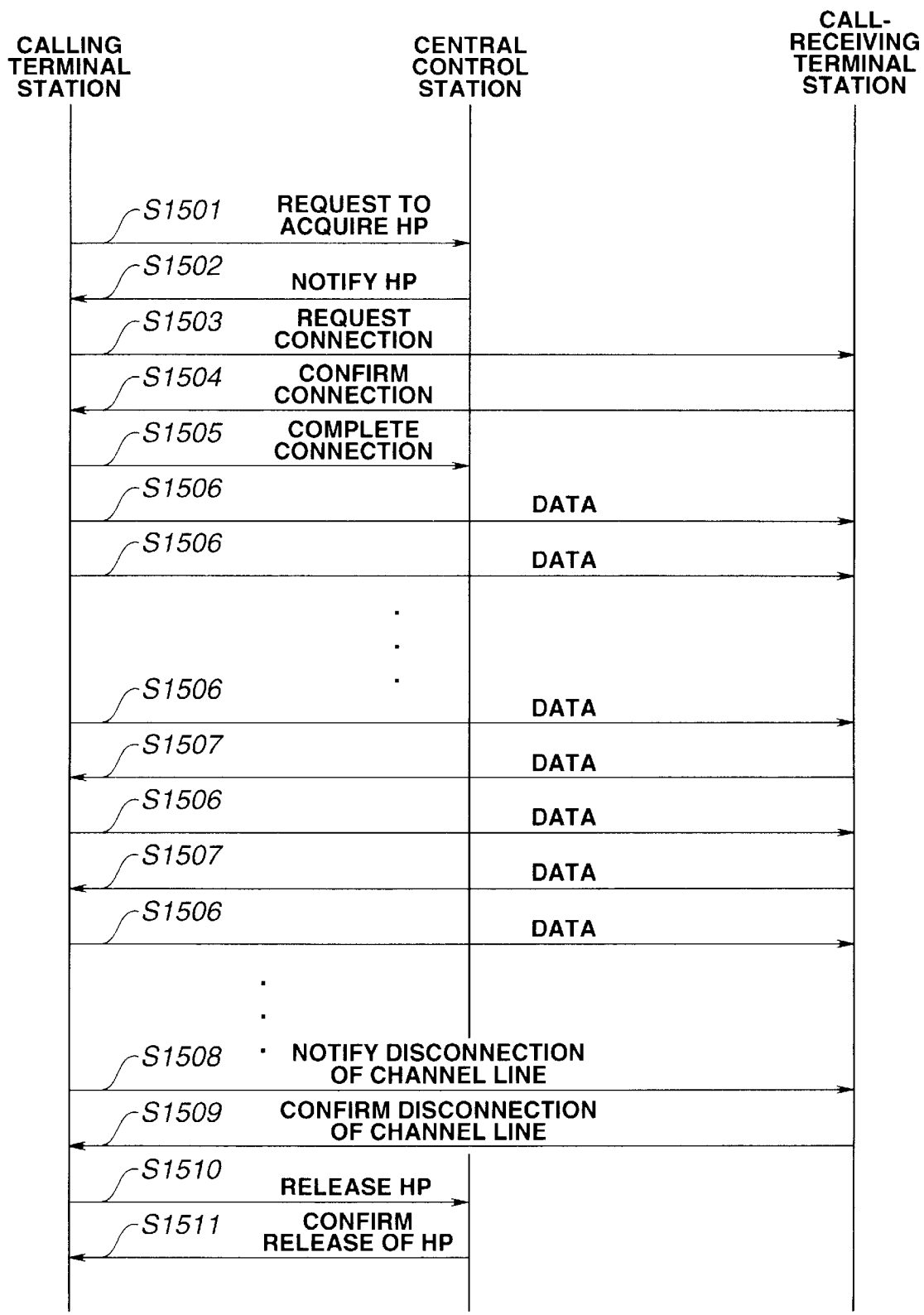
FIG. 15 is a diagram illustrating a communication sequence between data terminals in the first embodiment.
Figure 16:
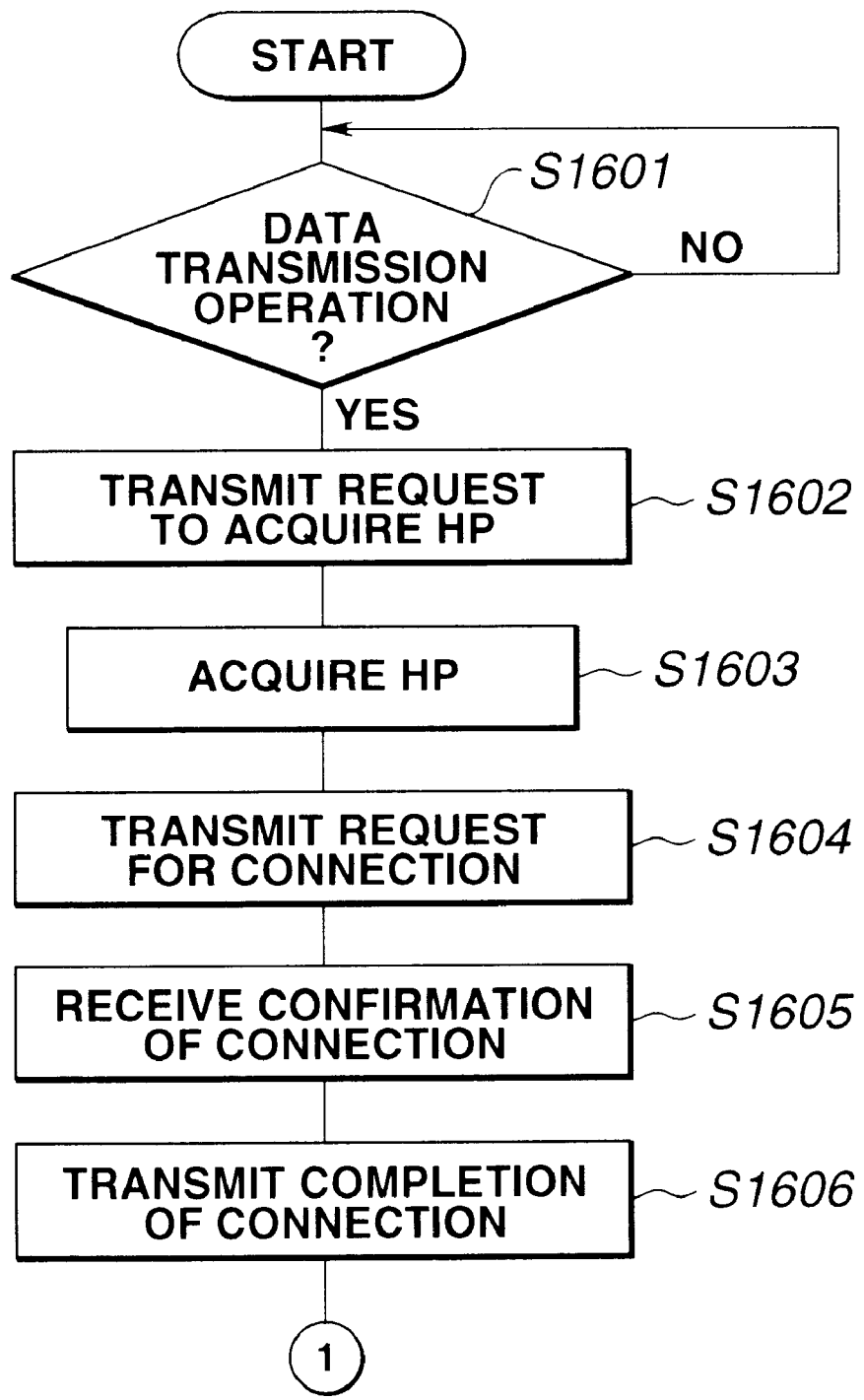
FIG. 16 is a flowchart illustrating call connection of a calling terminal station in the first embodiment.
Figure 17:
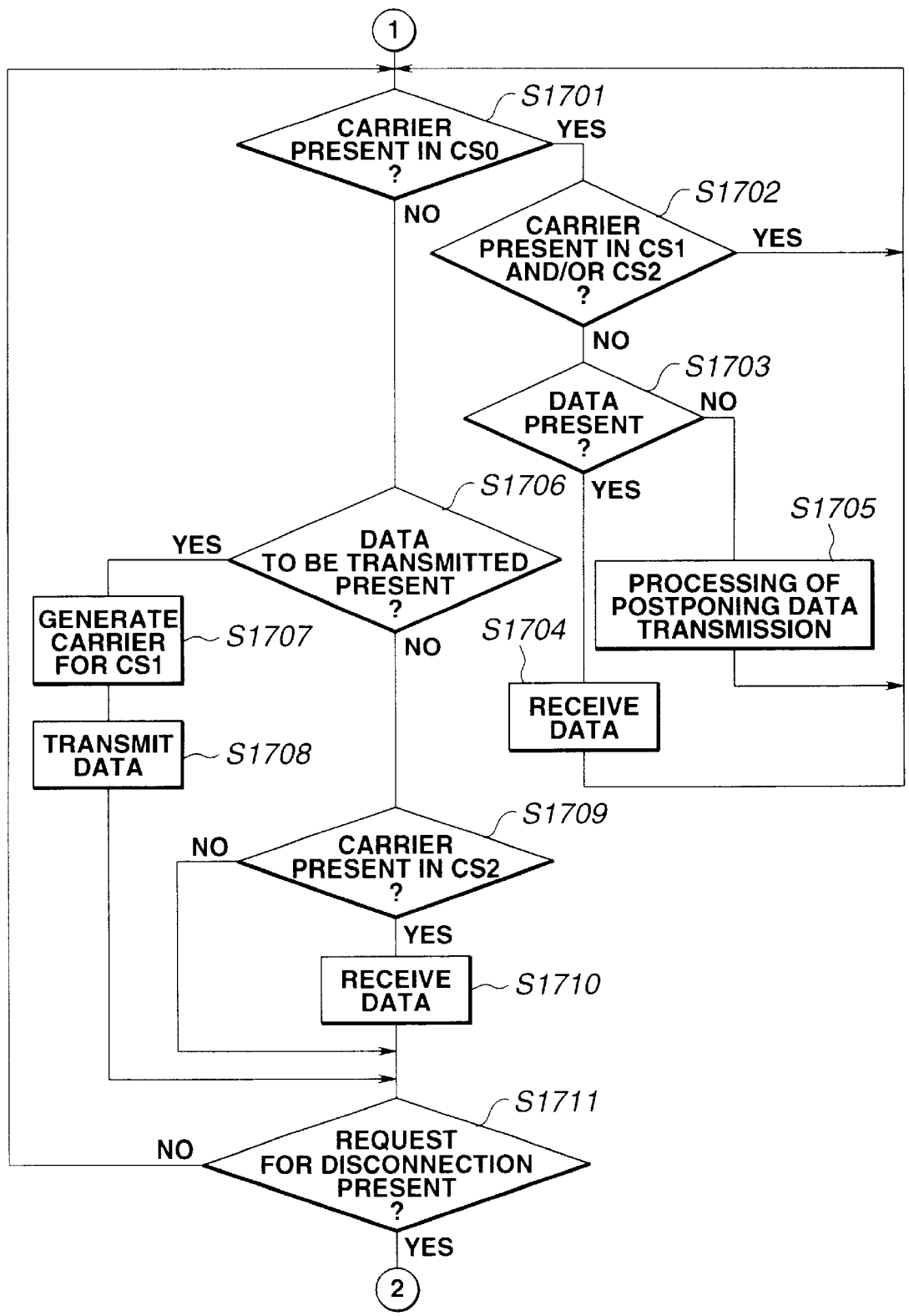
FIG. 17 is a flowchart illustrating data transmission of the calling terminal station in the first embodiment.
Figure 18:
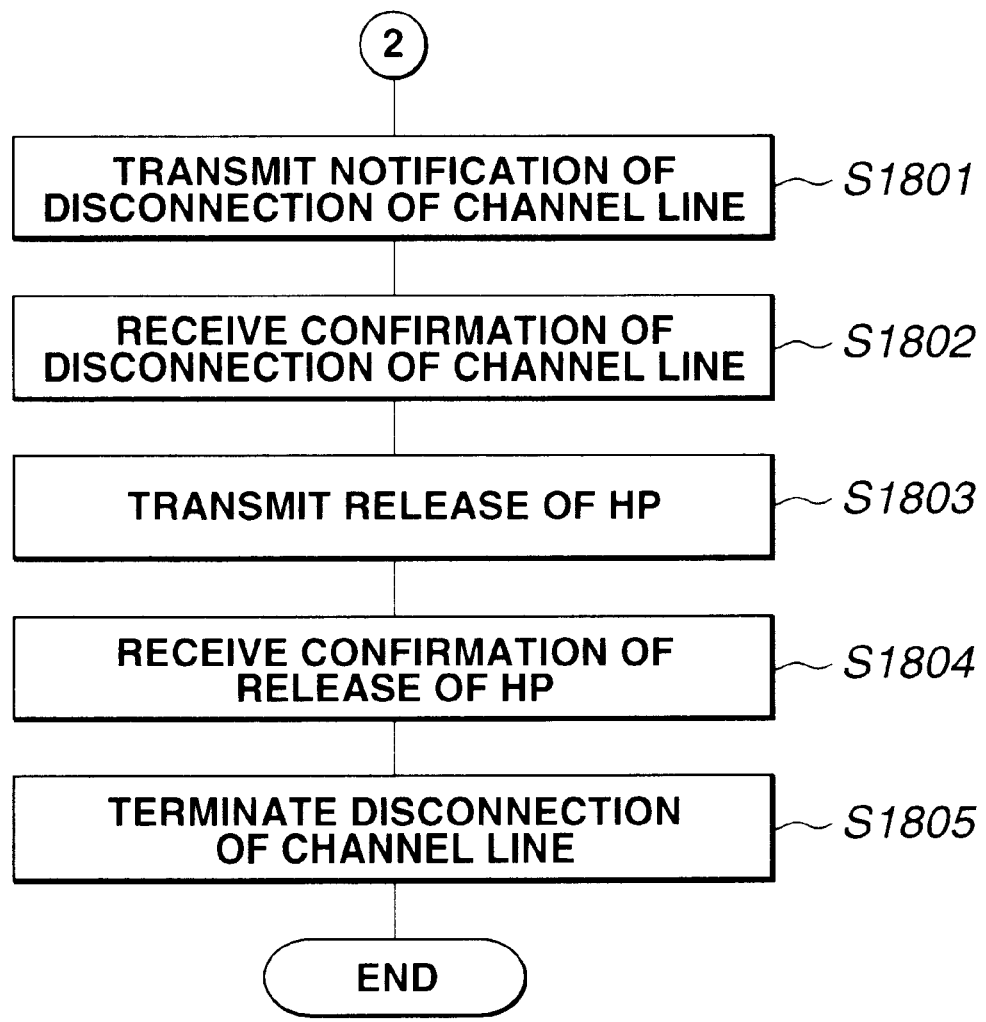
FIG. 18 is a flowchart illustrating communication disconnection of the calling terminal station in the first embodiment.

FIG. 15 is a diagram illustrating a communication sequence between data terminals in the first embodiment. FIG. 16 is a flowchart illustrating the operation of a calling terminal station during connection in data communication in the first embodiment. FIG. 17 is a flowchart illustrating the operation of the calling terminal station during data transmission in the first embodiment. FIG. 18 is a flowchart illustrating the operation of the calling terminal station during disconnection of the radio channel in the first embodiment.

A description will now be provided of the operations of the calling terminal station with reference to FIGS. 15–18.

In FIG. 16, when a transmission operation has been performed at the calling terminal station of the radio terminal (as a result of determination in step S1601), a hopping-pattern-acquisition request 1501 is transmitted, to the central control station 101 (step S1602). The hopping pattern is acquired by receiving a hopping-pattern notification 1502 from the central control station 101 (step S1603). After receiving the hopping pattern, a connection request 1503 is transmitted to the call-receiving terminal station, and the hopping pattern to be used in communication is notified (step S1604). When confirmation of connection 1504 has been received from the call-receiving terminal station (step S1605), completion of connection 1505 is transmitted to the central control station 101 (step S1505), and call connection is completed (step S1606). Upon completion of call connection, data communication is performed. In the present embodiment, a description will be provided of a case in which data is transmitted from the calling terminal station, and data is transmitted from the call-receiving terminal station only in an urgent case.

Upon start of communication, the calling terminal station first detects the carrier in the CS0 on the data frame by the carrier detection unit 313 (step S1701 shown in FIG. 17). When the carrier has been detected in the CS0, the carrier detection unit 313 then detects the carrier in the CS1 and CS2 (step S1702). When the carrier has been detected in at least one of the PS1 and CS2, it is determined that noise is generated, and the process returns to step S1701, where the carrier in CS0 is detected again.

As described above, when the carrier has been detected at least two carrier sensing time slots from among CS0, CS1 and CS2, it is determined that noise is generated, and this operation is repeated until noise disappears.

When the carrier has not been detected in both of the CS1 and CS2 as a result of determination in step S1702, it is then determined if data is present in the data frame (step S1703).

If data is present, it is determined that the data is urgent data (such as a request of retransmission, or the like) from the call-receiving terminal station, and processing of receiving data 1507 is performed (step S1705). If data is absent, it is determined that data receiving processing at the call-receiving terminal station is delayed, and processing of causing to postpone data transmission is performed to delay transmission of data (step S1705).

When the carrier has not been detected in the CS0 in step S1701, it is then determined if data to be transmitted is present at the calling terminal station (step S1706). If the result of the determination in step S1706 is affirmative, the carrier is generated for the CS1 by the carrier generation unit 312 (step S1707). Then, data 1506 is transmitted (step S1708). If the result of the determination in step S1706 is negative, the carrier in the CS2 is detected (step S1709). When the carrier has been detected in the CS2, ordinary data 1507 from the call-receiving terminal station is received (step S1710). Then, it is determined if a request to disconnect the radio network from the data terminal 401 is present (step S1711).

If the result of the determination in step S1711 is negative, the process returns to step S1701, and the above-described operations are repeated. If the result of the determination in step S1711 is affirmative, the process proceeds to the phase of disconnection of the radio network.

When a request to disconnect the radio channel has been transmitted from the data terminal 301, the calling terminal station shifts to the disconnection phase, and transmits channel-disconnection notification 1508 to the call-receiving terminal station (step S1801 shown in FIG. 18).

Upon reception of the channel-disconnection notification 1508, the call-receiving terminal station transmits a channel-disconnection-confirmation signal 1509. Upon reception of the channel-disconnection confirmation signal 1509 (step S1802), the calling terminal station transmits a hopping-pattern-release signal 1510 for releasing the hopping pattern being used to the central control station (step S1803). Upon reception of a hopping-pattern-confirmation signal 1511 transmitted from the central control station, the disconnection phase of the radio channel is terminated (step S1805).

Next, a description will be provided of the operation of the call-receiving terminal station with reference to FIG. 15 and FIGS. 19–21.

Figure 19:
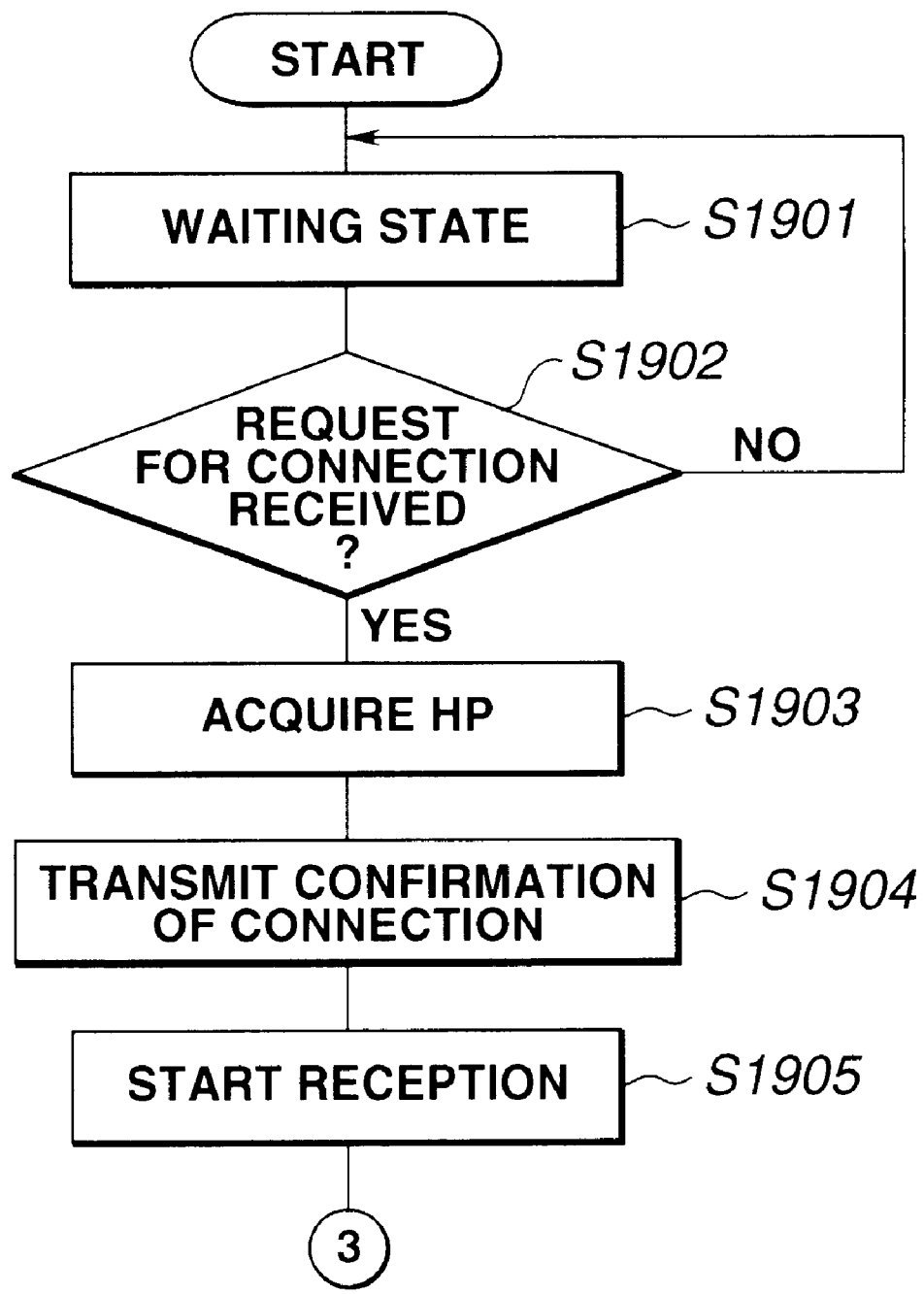
FIG. 19 is a flowchart illustrating call connection of a call-receiving terminal station in the first embodiment.

In FIG. 19, when the call-receiving terminal station is in a waiting state (step S1901), if a request for connection 1503 from the calling terminal station has been received (as a result of determination in step S1902), a hopping pattern is notified and the hopping pattern to be used in communication is acquired (step S1903). Upon acquisition of the hopping pattern, the call-receiving terminal station transmits confirmation of connection 1504 to the calling terminal station (step S1904), and the reception of data is started (step S1905).

Figure 20:
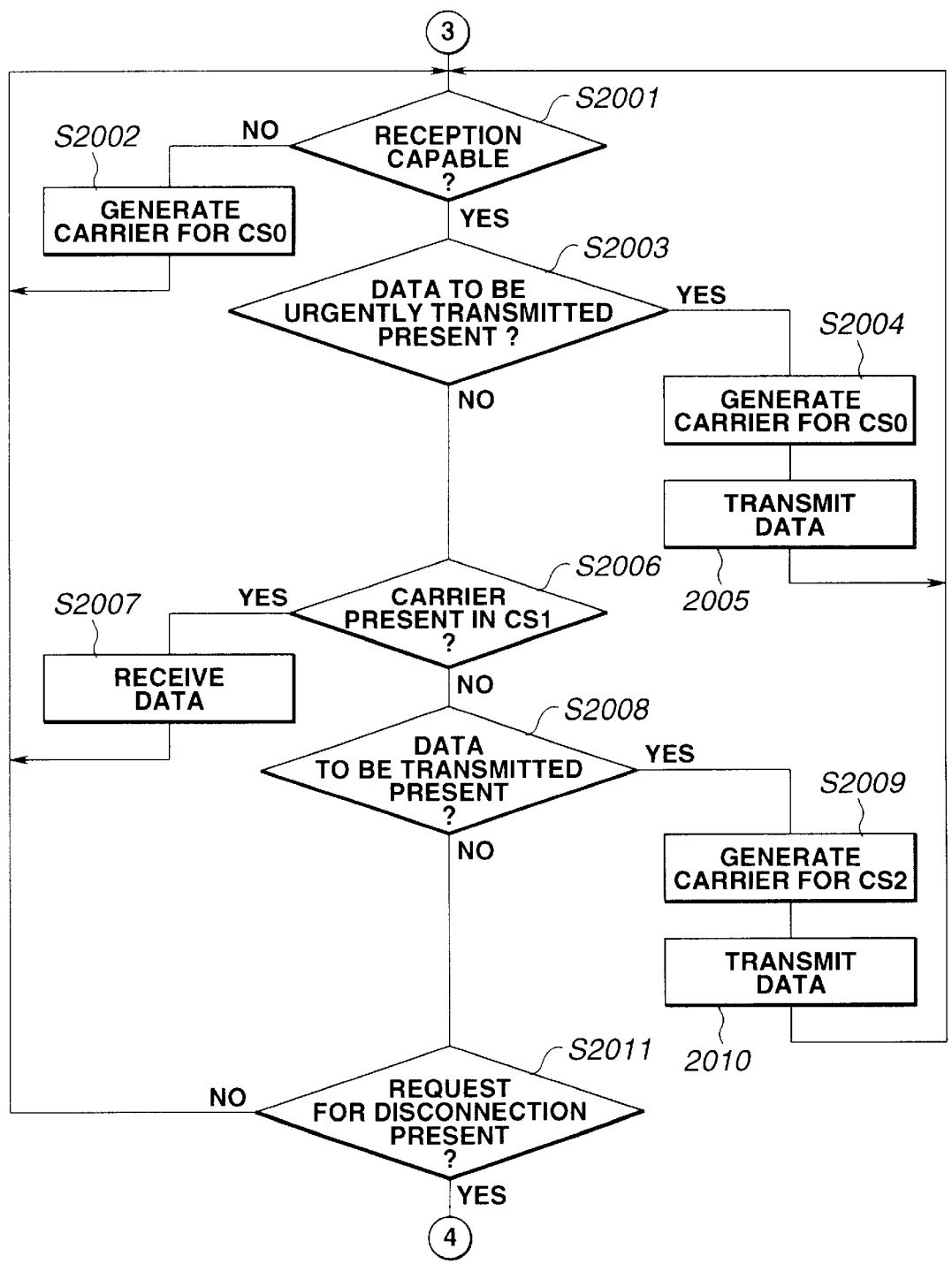
FIG. 20 is a flowchart illustrating data reception of the call-receiving terminal station in the first embodiment.
Figure 21:
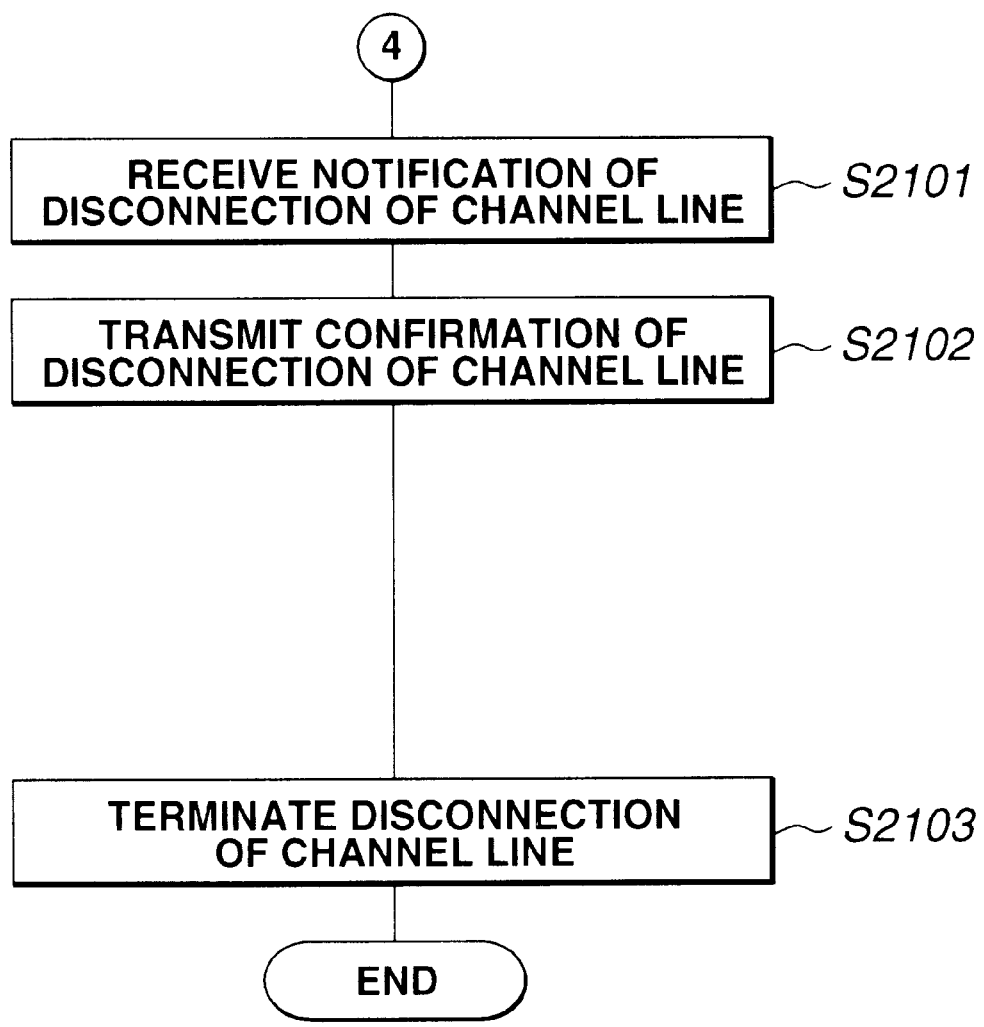
FIG. 21 is a flowchart illustrating communication disconnection of the call-receiving terminal station in the first embodiment.

When the reception of data has been started, the call-receiving terminal station determines if reception processing not delayed (step S2001 shown in FIG. 20). When the reception processing has been delayed and data cannot be received, the carrier generation unit 312 generates the carrier for the CS0 in order to cause the calling terminal station to interrupt transmission of data (step S2002). At that time, the call-receiving terminal station transmits data without providing data for the data-channel frame. When the reception processing is not delayed and therefore can be continued as a result of the determination in step S2001, it is then determined if data to be urgently transmitted is present (step S2003). If the result of the determination in step S2003 is affirmative, the carrier generation unit 312 generates the carrier for the CS0 (step S2004), and data to be urgently transmitted 1507 is provided in the data-channel frame and the resultant data is transmitted to the calling terminal station (step S2005).

If the result of the determination in step S2003 is negative, the detection of the carrier in the CS1 within the frame transmitted from the calling terminal station is performed by the carrier detection unit 313 (step S2006). When the carrier has been detected in the CS1, it is determined that the calling terminal station has transmitted data, and data is received (step S2007). If the carrier has not been detected in the CS1 as a result of the determination in step S2006, it is then determined if data to be transmitted from the calling terminal station to the call-receiving terminal station is present (step S2008). If the result of the determination in step S2008 is affirmative, the carrier generation unit 312 generates the carrier for the CS2 (step S2009), and data is provided in the data-channel frame and the resultant data is transmitted (step S2010). The above-described operations are repeated until the disconnection of the radio channel is requested from the calling terminal station (as a result of determination in step S2011).

Upon reception of notification of disconnection of the channel from the calling terminal station (step S2101 shown in FIG. 21), the call-receiving terminal station transmits confirmation of disconnection of the channel to the calling terminal station (step S2102), and the radio channel is disconnected (step S2103).

The generation and detection of the carrier as shown in FIGS. 17 and 20 may be performed for every frame, or at every preset number of frame transmission/reception operations.

As described above, according to the first embodiment, even a terminal having a low priority order of data transmission can transmit urgent data, and can interrupt transmission of data from the transmission side only by performing processing of generating a carrier when reception processing is delayed. Furthermore, the transmission-side terrminal can determine whether the reception processing of the reception-side terminal is delayed or noise is generated only by detecting the carrier.

In the first embodiment, a description has been provided of communication between radio communication terminals. When a data terminal connected to the central control station via a wired line is present or when a public telephone line is connected to the central control station, data is exchanged between the radio communication terminal and the central control station. The communication operation between the central control station and the radio communication terminal at that time is the same as in the above-described operation of the first embodiment.

Although, in the first embodiment, a carrier is generated for a specific time slot in order to notify interruption of data transmission, notification of any other control information than the notification of interruption of data transmission may also be performed. That is, by providing a plurality of time slots for carrier generation, a plurality of control information can be notified by generating a carrier. At that time, the radio communication terminal must store the contents of respective controls in the memory together with corresponding time slots.

As described above, according to the first embodiment, when the above-described reception processing is delayed and data cannot be received, the reception-side terminal can cause the transmission-side terminal to interrupt data transmission by only generating a carrier for a specific time slot in a frame, without performing complicated control of forming control data for causing the transmission-side terminal to interrupt data transmission, performing error correction coding of the formed data and transmitting the resultant data together with a carrier for requesting data transmission.

The transmission-side terminal can determine that the reception processing of the reception-side terminal is delayed by only detecting a carrier in a specific time slot in a frame, without performing complicated control of analyzing control data transmitted from the reception-side terminal after correcting errors in the data.

Since determination whether the transmitted data is a carrier for requesting data transmission or mere noise can be performed by detecting a carrier in a predetermined time slot in a frame, the determination can be easily performed in a short time period.

Second Embodiment

Next, a second embodiment of the present invention will be described.

Figure 22:
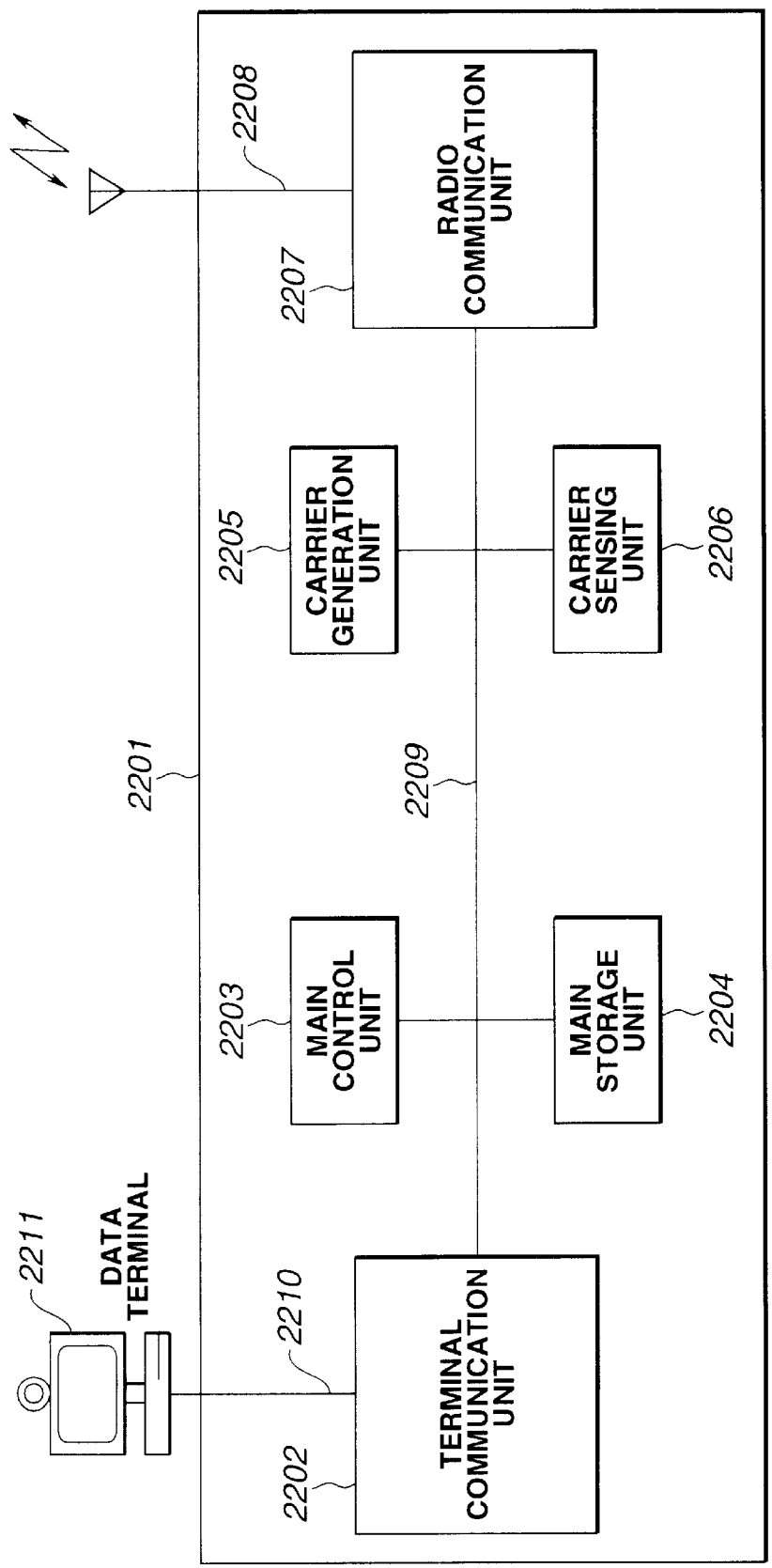
FIG. 22 is a block diagram illustrating the configuration of a radio adapter according to a second embodiment of the present invention.

FIG. 22 illustrates the configuration of a radio adapter according to the second embodiment.

In FIG. 22, a radio adapter 2201 communicates data from a data terminal 2211 using radio waves. A terminal communication unit 2202 exchanges data with the data terminal 2211. A main control unit 2203 controls the entire radio adapter 2201 in accordance with processing procedures (programs) stored in a main storage unit 2204. The main storage unit 2204 stores programs to be executed by the main control unit 2203, various kinds of control data, and the like. A carrier generation unit 2205 generates a carrier indicating declaration of intention of performing data communication using a radio communication unit 2207 or a carrier indicating that data cannot be received because of delay of reception processing while discriminating between them. A carrier sensing unit 2206 detects data or a carrier transmitted from another terminal, and checks the interval of the received carrier. The radio communication unit 2207 controls transmission/reception of data and carriers. An antenna 2208 transmits and receives data and carriers. Reference numeral 2209 represents an internal bus of the radio adapter 2201. Reference numeral 2210 represents a line for connecting the data terminal 2211 and the radio adapter 2201, and comprises, for example, a LAN, an SCSI (small computer system interface), RS232C, or an internal bus of the data terminal 2211. The data terminal 2211 performs formation, display, printing or the like of data.

In the second embodiment, a state in which the radio adapter 2201 is connected to the data terminal 2211 is termed a radio communication state, and a case in which communication is performed between two radio communication apparatuses will be described.

Figure 23:
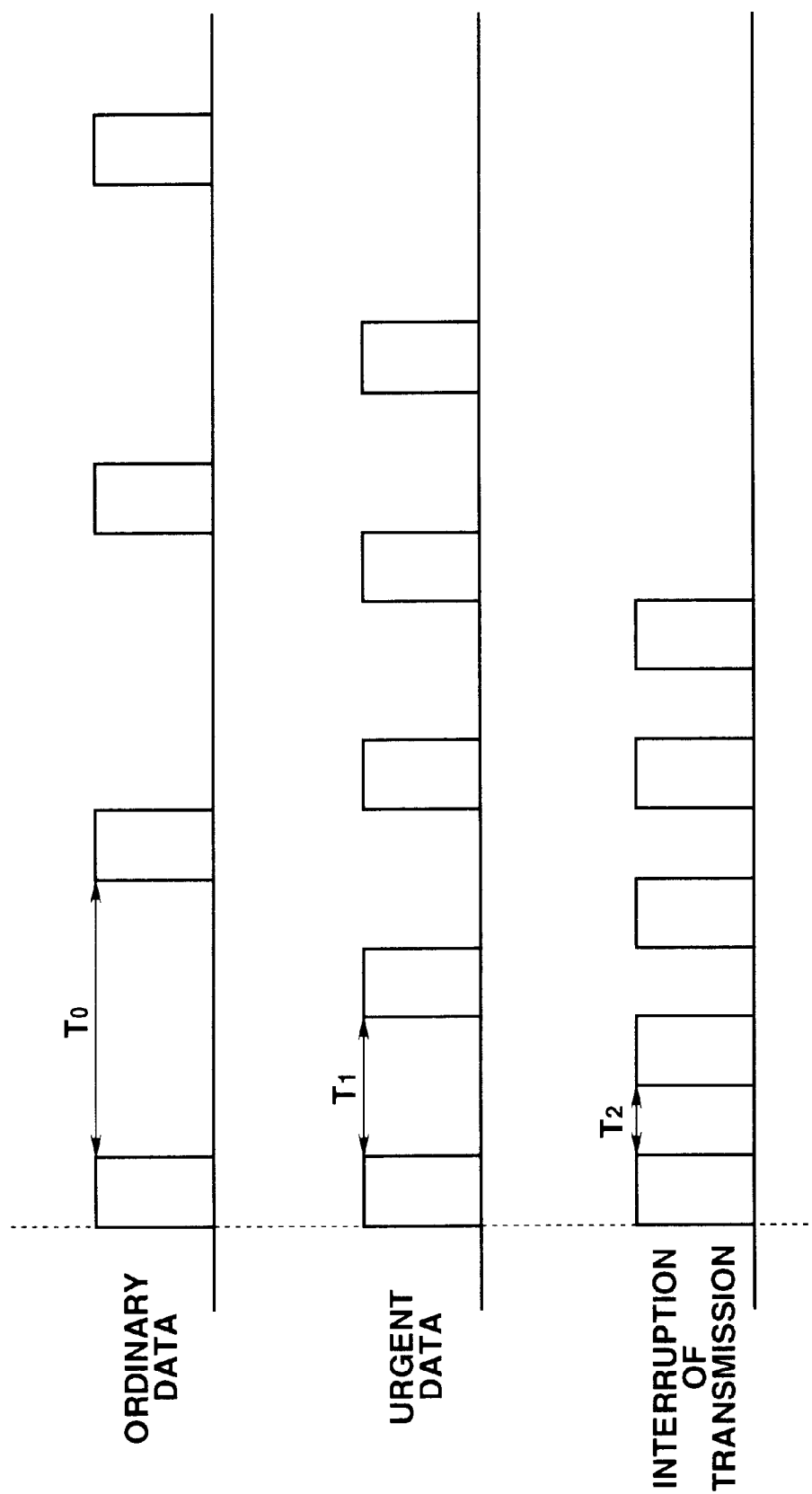
FIG. 23 is a diagram illustrating examples of transmission of carriers in the second embodiment.

FIG. 23 illustrates states of generation of carriers in the second embodiment.

In FIG. 23, $T_2<T_1<T_0$. When transmitting ordinary data, a carrier indicating declaration of intention of performing data transmission is generated at the interval $T_0$. When data to be urgently transmitted (data having a high priority order) is present, a carrier indicating declaration of intention of data transmission is generated at the interval $T_1$. When reception processing is delayed while a radio communication apparatus receives data and reception of data cannot be performed, a carrier is generated at the interval $T_2$.

In the second embodiment, when the radio communication apparatus at the transmission side has received a carrier at the interval $T_2$, the radio communication apparatus at the transmission side determines that the reception processing of the radio communication apparatus at the reception side is delayed, and temporarily interrupts data transmission.

Figure 24:
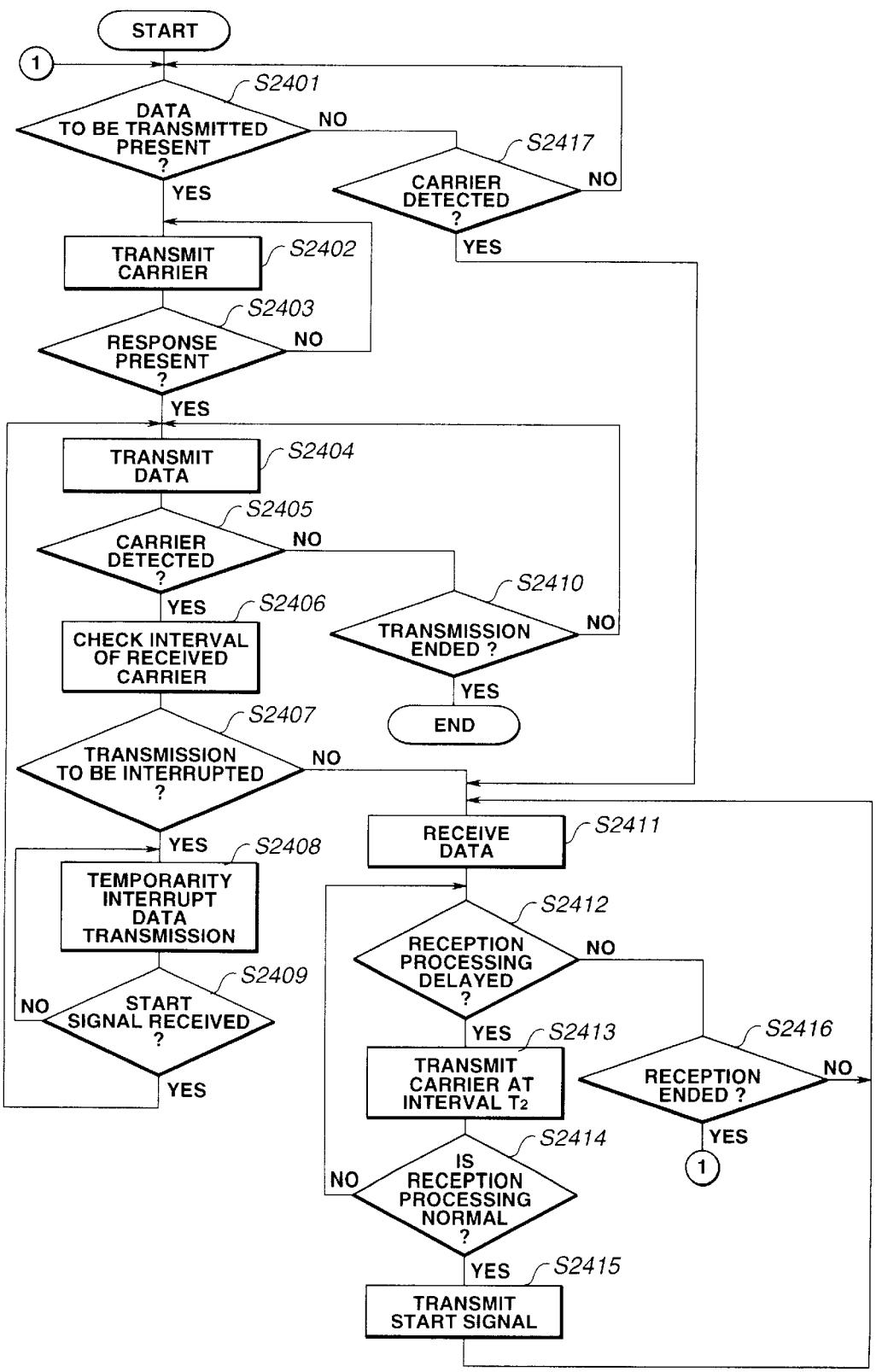
FIG. 24 is a flowchart illustrating the operation of a radio communication terminal in the second embodiment.

FIG. 24 is a flowchart illustrating the operation of the radio communication apparatus in the second embodiment.

In FIG. 24, if data to be transmitted is present in the data terminal 2211 (step S2401), a carrier generated by the carrier generation unit 2205 is transmitted via the radio communication unit 2207 (step S2402). When a response signal indicating a state of receiving data has been received from the radio communication apparatus at the reception side (as a result of determination in step S2403), data transmission is started (step S2404).

After transmitting a predetermined amount of data, the radio communication apparatus at the transmission side performs carrier sensing by the carrier sensing unit 2206. When the carrier has been detected by the carrier sensing unit 2206 (as a result of determination in step S2405), the interval of the received carrier is checked (step S2406). When the interval of the received carrier is $T_2$, the radio communication apparatus at the transmission side determines that the reception processing of the radio communication apparatus at the reception side is delayed (as a result of determination in step S2407), and the data transmission is temporarily interrupted (step S2408).

Then, when a data-transmission start signal has been received (as a result of determination in step S2409), data transmission is resumed in order to transmit remaining data.

When the interval of the received carrier is $T_1$ in step S2406, the radio communication apparatus at the transmission side determines that the radio communication apparatus at the reception side has data to be urgently transmitted, and receives data transmitted from the radio communication apparatus at the reception side (step S2411).

Thereafter, when reception processing of data being received has been delayed (as a result of determination in step S2412), and data reception cannot be continued, a carrier is transmitted at the interval $T_2$ in order to cause the apparatus in communication to interrupt data transmission (step S2413). At that time, the apparatus in communication detects the carrier at the interval $T_2$, and temporarily interrupt data transmission.

Then, when it has been determined that the reception processing has returned to a normal state (as a result of determination in step S2414), a start signal indicating that data transmission can be resumed (step S2415), and data reception is resumed.

If data reception processing is not delayed as a result of the determination in step S2412, the data reception processing is continued until data reception is completed (step S2416).

When a carrier has not been detected while performing data transmission (as a result of the determination in step S2405), and data transmission has been completed (as a result of determination in step S2410), the process is terminated.

When data to be transmitted is absent in the data terminal 2211 as a result of the determination in step S2401, and the carrier sensing unit 2206 has detected a carrier (as a result of determination in step S2417), the concerned radio communication apparatus operates as the radio communication apparatus at the reception side, and the process proceeds to step S2411, where data reception is started.

As described above, by setting a carrier transmission interval for causing interruption of data transmission which is different from a carrier transmission interval when transmitting a carrier, data transmission can be interrupted by only transmitting the carrier at a predetermined interval, without performing complicated processing of forming control data for causing interruption of data transmission and transmitting the formed data together with the carrier.

The radio communication apparatus which transmits data determines that the reception processing of the apparatus in communication is delayed by only detecting a carrier having a predetermined interval, and interrupts the data transmission. Hence, it is unnecessary to perform complicated processing of analyzing received data as in the conventional approach.

The interval of transmission of a carrier in the second embodiment may be preset, or may be determined in a preprocedure for data communication.

In the first and second embodiments, when data reception processing is delayed, the apparatus which receives data causes the apparatus in communication to interrupt data transmission. Alternatively, the apparatus which receives data may cause the apparatus in communication to reduce the speed of data transmission.

As described above, according to the present invention, it is possible to notify control information by transmitting/receiving a carrier which is indispensable in radio communication without communicating complicated control data.

The radio communication apparatus which has received a carrier can determine the contents of notification from the apparatus in communication without analyzing complicated control data.

Furthermore, the presence of noise can be determined with a simple method.

The individual components designated by blocks in the drawings are all well known in the radio communication apparatus and method arts and their specific construction and operation are not critical to the operation or the best mode for carrying out the invention.

While the present invention has been described with respect to what are presently considered to be the preferred embodiments, it is to be understood that invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A radio communication apparatus for performing communication using radio waves, said radio communication apparatus comprising:

control data transmission means for forming control data and transmitting the control data to a communication partner;

carrier transmission means for transmitting a carrier;

reception means for receiving data transmitted from the communication partner;

data processing means for processing data received from the communication partner by said reception means;

determination means for determining a processing state of said data processing means; and control means for controlling said control data transmission means and said carrier transmission means so as to selectively transmit the carrier by said carrier transmission means to the communication partner and the control data by said transmission means in accordance with a determination of said determination means.

2. An apparatus according to claim 1, wherein, when said determination means determines that the processing of said data processing means is delayed, said control means controls said carrier transmission means so as to transmit the carrier to the communication partner, thereby to notify the communication partner of an interruption of transmission.

3. An apparatus according to claim 1, wherein said control means controls said carrier transmission means so as to transmit the carrier in a specific time slot in a communication frame.

4. An apparatus according to claim 1, wherein said control means controls said carrier transmission means so as to transmit the carrier at a predetermined interval.

5. A radio communication apparatus for performing communication using radio waves, said radio communication apparatus comprising:

carrier reception means for receiving a carrier from a communication partner;

transmission means for transmitting data to the communication partner;

determination means for detecting a carrier received by said carrier reception means during data transmission by said transmission means, and for determining a processing state of the communication partner on the basis of the detected carrier; and control means for controlling said transmission means in accordance with a determination of said determination means.

6. An apparatus according to claim 5, wherein said control means interrupts the transmission of the data by said transmission means in accordance with the determination of said determination means.

7. An apparatus according to claim 5, wherein said determination means determines that reception processing of the communication partner is delayed when the carrier is detected in a specific time slot in a communication frame.

8. An apparatus according to claim 5, wherein said determination means determines that reception processing of the communication partner is delayed when a carrier having a specific interval is detected.

9. A radio communication apparatus, which notifies predetermined information to an apparatus in communication with said radio communication apparatus by transmitting a carrier to a predetermined number of time slots of a communication frame having a plurality of time slots and notifies different information in accordance with which time slot the carrier is to be transmitted to among the Plurality of time slots, said apparatus comprising:

determination means for determining whether the carrier is detected in the predetermined number of time slots among the plurality of time slots or in more than the predetermined number of time slots;

control means for controlling based on the carrier when said determination means determines that the carrier is detected in the predetermined time slots, and for judging that noise is generated when said determination means determines that the carrier is detected in more than the predetermined number of time slots.

10. A radio communication apparatus according to claim 9, wherein said radio communication apparatus does not perform communication when said control means has judged that noise is generated.

11. A radio communication apparatus according to claim 9, wherein said radio communication apparatus temporarily interrupts communication when said control means has judged during the communication that noise is generated.

12. A method of controlling a radio communication apparatus for performing communication using radio waves, said method comprising
  a control data transmission step of forming control data and transmitting the control data to a communication partner;
  a receiving step of receiving data transmitted from a communication partner;
  a processing step of processing data received from the communication partner;
  a determining step of determining a processing state of the data processed in said processing step; and
  a controlling step of controlling the apparatus so as to transmit a carrier to the communication partner instead of transmitting control data in said transmission step in accordance with a determination in said determining step.

13. A method according to claim 12, wherein, when said determining step determines that the processing of the data is delayed, said controlling step controls the transmission of the carrier so as to notify the communication partner of an interruption of transmission.

14. A method according to claim 12, wherein said controlling step transmits the carrier in a specific time slot in a communication frame.

15. A method according to claim 12, wherein said controlling step transmits the carrier at a predetermined interval.

16. A method of controlling a radio communication apparatus for performing communication with a communication partner using radio waves, said method comprising:
  a receiving step of receiving a carrier from the communication partner;
  a determining step of determining the processing state of the communication partner on the basis of a received carrier, when the carrier is received in said receiving step during transmission of data to the communication partner; and
  a controlling step of performing a predetermined control operation in accordance with a determination in said determining step.

17. A method according to claim 16, wherein said controlling step performs control so as to interrupt data transmission.

18. A method according to claim 16, wherein said detecting step detects the carrier in a specific time slot of a communication frame, said determining step determines that reception processing of the communication partner is delayed.

19. A method according to claim 16, wherein said detecting step detects a carrier having a specific interval, said determining step determines that reception processing of the communication partner is delayed.

20. A method of controlling a radio communication apparatus which notifies predetermined information to an apparatus in communication with said radio communication apparatus by transmitting a carrier to a predetermined number of time slots of a communication frame having a plurality of time slots and notifies different information in accordance with which time slot the carrier is to be transmitted to among the plurality of time slots, said method comprising the steps of:
  determining whether the carrier is detected in the predetermined number of time slots among the plurality of time slots or in more than the predetermined number of time slots;
  controlling based on the carrier when the determining step determines that the carrier is detected in the predetermined time slots, and for judging that noise is generated when said determining step determines that the carrier is detected in more than the predetermined number of time slots; and
  performing a predetermined control in accordance with a determination in the determining step.

21. A method according to claim 20, wherein, when said controlling step has judged that noise is generated, said performing a predetermined control step performs control so as not to perform communication.

22. A method according to claim 20, wherein said controlling step has judged during the communication that noise is generated, said performing a predetermined control step temporarily interrupts the communication.

23. A radio communication apparatus for performing communication using a communication frame having at least a first time slot for communicating a carrier and a second time slot for communicating data, said apparatus comprising:
  detection means for detecting a carrier of the first time slot when performing communication using the communication frame, and for detecting data of the second time slot when the carrier is detected; and
  control means for performing different control operations of said apparatus when the carrier and the data are detected and when the carrier is detected and the data is not detected.

24. A radio communication apparatus according to claim 23, wherein reception control of the data detected by said detection means is performed when the carrier and the data are detected by said detection means.

25. A radio communication apparatus according to claim 23, wherein transmission of the data is interrupted when the carrier is detected by said detection means and the data is not detected by said detection means.

26. A radio communication apparatus according to claim 23, further comprising determination means for determining that there is a delay in the reception processing by a communication partner when the carrier is detected by said detection means and the data is not detected by said detection means.

27. A radio communication apparatus according to claim 23, wherein the first time slot is a time slot for designating transmission of data to a communication partner when transmitting the data to the communication partner.

28. A radio communication apparatus for performing communication using a communication frame having at least a first time slot for communicating a carrier and a second time slot for communicating data, said apparatus comprising:
  transmission means for transmitting a carrier using the first time slot, and for transmitting data using the second time slot;
  receiving means for receiving a carrier and data transmitted from a communication partner;
  data processing means for processing the data received by said receiving means using the second time slot; and
  judging means for judging whether to transmit the carrier and the data by said transmission means or to transmit the carrier by said transmission means and not to transmit the data by said transmission means in accordance with a processing state of said data processing means.

29. A radio communication apparatus according to claim 28, wherein said judging means judges that said transmission means transmits the carrier and does not transmit the data when there is a delay in the processing of the data by said data processing means.

30. A radio communication apparatus according to claim 28, wherein said judging means judges that said transmission means transmits the carrier and does not transmit the data when it is desired to interrupt the transmitting operation by a communication partner.

31. A radio communication apparatus according to claim 28, wherein said first time slot is a time slot for designating the transmission of data to a communication partner when transmitting the data to the communication partner.

32. A method of controlling a radio communication apparatus for performing communication using a communication frame having at least a first time slot for communicating a carrier and a second time slot for communicating data, said method comprising:

a detection step of detecting a carrier of said first time slot when performing communication using said communication frame, and of detecting data of said second time slot when a carrier is detected; and a control step of performing different control operations of the apparatus when the carrier and the data are detected in said detection step and when the carrier is detected and the data is not detected in said detection step.

33. A method according to claim 32, wherein reception control of the data detected in said detection step is performed when the carrier and the data are detected in said detection step.

34. A method according to claim 32, wherein transmission of the data is interrupted when the carrier is detected in said detection step and the data is not detected in said detection step.

35. A method according to claim 32, wherein it is judged that there is a delay in the reception processing by a communication partner when the carrier is detected and the data is not detected in said detection step.

36. A method according to claim 32, wherein the first time slot is a time slot for designating transmission of data to a communication partner when transmitting the data to the communication partner.

37. A method of controlling a radio communication apparatus for performing communication using a communication frame having at least a first time slot for communicating a carrier and a second time slot for communicating data, said method comprising:

a transmission step of transmitting a carrier using the first time slot, and of transmitting data using the second time slot;

a receiving step of receiving a carrier and data transmitted from a communication partner;

a data processing step of processing the data received in said receiving step using the second time slot; and a judging step of judging whether to transmit the carrier and the data in said transmission step or only to transmit the carrier and not to transmit the data in said transmission step in accordance with a processing state of the data in said data processing step.

38. A method according to claim 37, wherein said judging step judges that the carrier is transmitted and that the data is not transmitted in said transmission step when there is a delay in the processing of the data in said data processing step.

39. A method according to claim 37, wherein said judging step judges that the carrier is transmitted and that the data is not transmitted in said transmission step when it is desired to interrupt the transmitting operation by a communication partner.

40. A method according to claim 37, wherein said first time slot is a time slot for designating transmission of data to a communication partner when transmitting the data to the communication partner.

* * * * *

UNITED STATES PATENT AND TRADEMARK OFFICE
CERTIFICATE OF CORRECTION

PATENT NO. : 6,088,350

DATED : July 11, 2000

INVENTOR(S): NAOTO KAGAYA

It is certified that error appears in the above-identified patent and that said Letters Patent is hereby corrected as shown below:

COVER PAGE AT ITEM [56]:
Primary Examiner: "Alpus H. Hsu" should read --Hassau Kizou--.

COLUMN 1:
Line 20, "and, temporarily" should read --and temporarily--.

COLUMN 7:
Line 58, "a-hopping" should read --a hopping--; and

COLUMN 8:
Line 58, "PS1" should read --CS1--.

COLUMN 14:
Line 49, "Plurality" should read --plurality--.

Signed and Sealed this

Seventeenth Day of April, 2001

Attest:

NICHOLAS P. GODICI

Attesting Officer

Acting Director of the United States Patent and Trademark Office